United States Patent [19]

Escobosa

[11] Patent Number: 4,590,764
[45] Date of Patent: May 27, 1986

[54] ALL-DIGITAL ELECTRICALLY POWERED SERVO

[76] Inventor: Alfonso S. Escobosa, 2034 Brittany Pl., Placentia, Calif. 92670

[21] Appl. No.: 693,531

[22] Filed: Jan. 22, 1985

[51] Int. Cl.$^4$ ............................................... F15B 9/03
[52] U.S. Cl. ...................................... 60/390; 60/475; 60/911
[58] Field of Search .......................... 60/390, 475, 911

[56] References Cited

U.S. PATENT DOCUMENTS 3,772,889  11/1973  Mason et al. ..................... 60/390 X
4,315,199   2/1982  Kyomasu et al. .

Primary Examiner—Gerald A. Michalsky

[57] ABSTRACT

This disclosure pertains to a completely digital, electrically powered servo wherein the servo actuator is minutely incremented at a frequency proportional to the magnitude of an error binary number. The binary error is derived from the difference of a binary reference representing the commanded position of the actuator and a binary feedback representing the position of the actuator. The direction of each increment has the polarity which reduces the difference between the reference and feedback binary numbers. The power unit of the servo is electrohydraulic; however, the servo is entirely electrically controlled and powered. Hydraulic fluid is confined to the power unit where it serves as a link between two solenoid driven piston pumps, a common mode volume adjuster and a hydraulic actuator. The direction the actuator is incremented is dependent on which of the two solenoids the error polarity directs pulsed electrical power.

3 Claims, 2 Drawing Figures

ALL-DIGITAL ELECTRICALLY POWERED SERVO

BACKGROUND

It has been believed that an all-digital, electrically powered servo if ever conceived should provide significant advantages over the currently used electrohydraulic servo. The advantages include the following:

1. Lower overall system complexity and cost. The opportunity exists to simply expand the electrical power system (which must be available in any case) to provide the added power instead of adding a hydraulic power system for this purpose.
2. Repeatable, "text book" quality performance.
3. Testability. Simple electric power turn-on, followed by computer-oriented self-test routines should suffice.
4. Potential for reduced energy consumption.
5. An inherent fail-safe power unit. Primary failures result in failure to increment.
6. An unprecedented high level of reliability in the power unit by reason of the use of simple, high force incrementers.

Other application-specific advantages should surface. For instance, in military aircraft flight control systems, a control-by-wire/power-by-wire concept would augment the flexibility of modern fly-by-wire control systems but omit the weight and the vulnerability of the hydraulic supply and distribution system. In computer aided manufacturing, an interface to a numerically controlled machine or robot which is all-electric and all-digital is likewise a highly desirable feature.

There are host of servos in operation which are labeled "digital," but an examination of the power units which is part of the overall servo reveals that they are analog. These servos require some form of digital to analog conversion which leaves them out of the category of "all-digital."

A servo having a stepper motor as the power unit qualifies as "all-digital" and "electrically powered" but theseservos either exhibit a high resolution and high load capacity but lack speed, or they exhibit speed but lack resolution and load capacity. Recently developed high speed, high force solenoids, however, provide the basis for meeting the joint requirement of speed and force if it were possible to effect bilateral incrementation in the presence of reversible loads. The proposed system accomplishes this in a manner unlike anything known in servo technology.

SUMMARY

The proposed servo incorporates two incrementers, one to increment the servo in the positive direction, the other to increment it in the negative direction. Each incrementer consists of a solenoid driven piston pump which increments a hydraulic actuator. The incrementation of the actuator is in conjunction with a common mode volume adjuster which is connected to the two actuator control chambers.

As one pump piston is extended to its end position, it injects a minute volume of fluid into one control chamber and into the volume adjuster. In the process, since the volume of fluid enters the volume adjuster in common mode manner from both control chambers, it partly increments the actuator. As the pump piston is allowed to retract, it ejects fluid from the opposite control chamber and the volume adjuster. Again, since fluid must leave the volume adjuster through both control chambers, the actuator is again incremented in the same direction. The volume adjuster, therefore, provides temporary storage for fluid introduced by the pump while, in itself, prevents fluid from transfering differentially from one control chamber to the other. The second pump is connected to the actuator in opposite polarity to the first so that the direction the actuator is incremented simply depends on which pump is operated. Details of the system will become more readily apparent from the following description when taken in conjunction with the accompanying drawings.

DRAWINGS

FIG. 1 is a functional diagram of the overall servo.
FIG. 2 is a detail drawing of the incrementer hydraulic piston pump.

DESCRIPTION OF THE PREFERRED EMBODIMENT

Overall Servo Description

Figure 1:
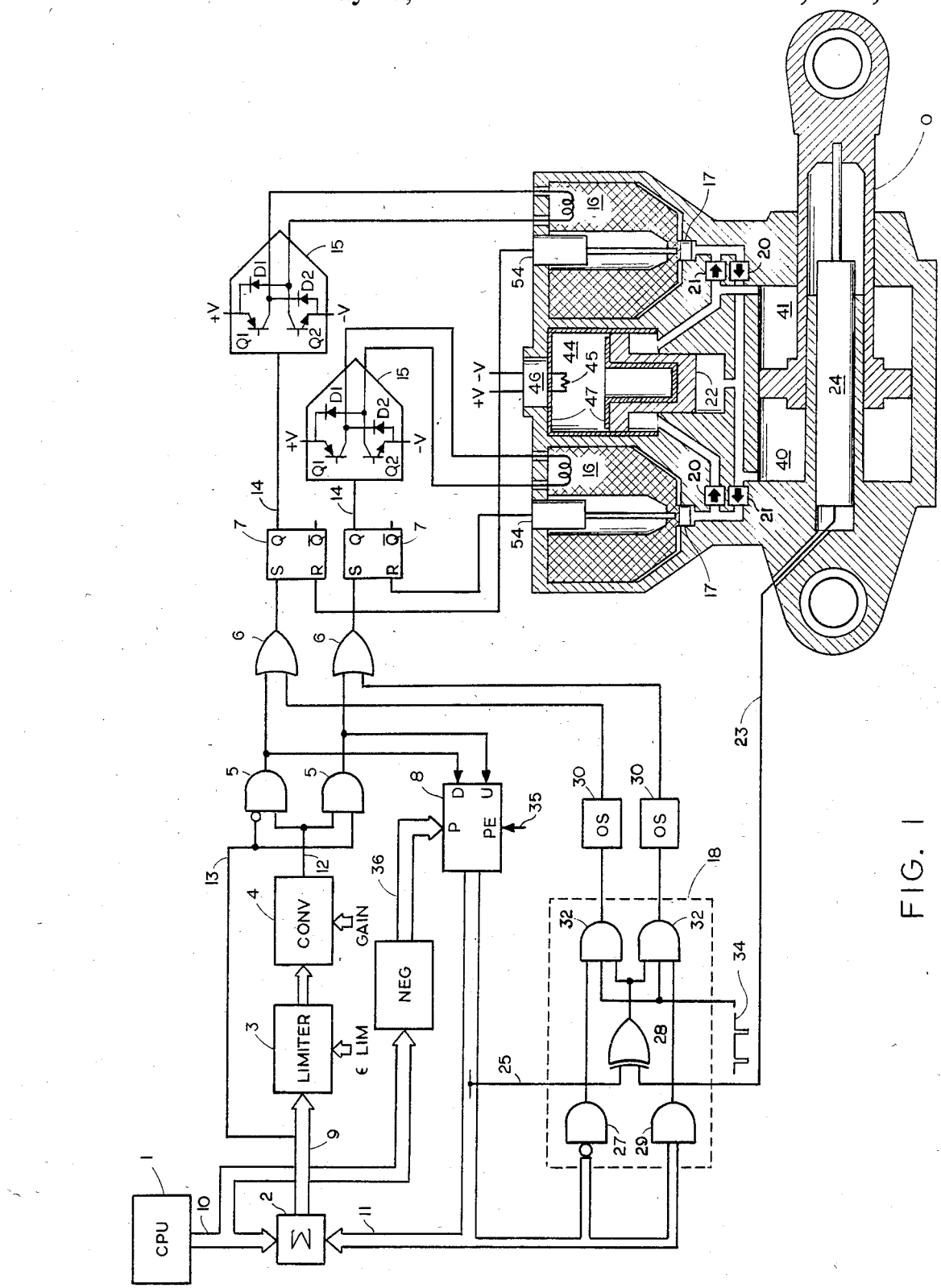

The proposed servo which is functionally described in FIG. 1 essentially consists of a numeric controller, two discrete signal controlled incrementers and an actuator (0).

The controller operations can be performed within a central processing unit (1) or by a special purpose processor. A special purpose implementation of the operations is implied in FIG. 1 and consists of adder (2), error limiter (3), error to pulse frequency converter (4), pulse steering AND gates (5), OR gates (6), set/reset flip flops (7) and up/down counter (8). The controller, which can be assumed to perform the arithmetic operations in two's complement format, calculates the binary error (9) between the binary reference (10) representing the commanded actuator position and the binary feedback (11) representing the actuator position, limits and converts the binary error to a pulse train (12) having a pulse repetition frequency which is proportional to the magnitude of the binary error. The pulse train is routed by the polarity bit (13) to either the up count or down count input of the up/down counter to provide a binary estimate of the actuator position. The pulse train is also routed to the set input of one of the two set/reset flip flops which inititates the formation of the servo drive signal (14). The drive signal is power amplified by power amplifier (15) and applied to solenoid (16) which extends the pump piston (17). A subsequent pulse applied to the reset input of the flip flop terminates the drive signal.

The set/reset flip flops can also be set through the OR gates by pulse signals originating from the offset correction circuits (18).

In addition to the indicated operations, a digital filter and/or non-linearity may be added to the reference, the feedback or the error branch of the adder to satisfy requirements of a particular servo application.

The volume of fluid displaced by the extension of a pump piston is injected into one of the actuator control chambers through the corresponding injection check valve (20). As the pump piston is retracted, the same volume is ejected out of the opposite control chamber through ejection check valve (21). During this injection/ejection cycle, a common mode volume adjuster (22) compensates for the momentary increase in volume common to both control chambers, first allowing injection, then forcing ejection. This causes two corresponding shifts in the actuator shaft, both in the same direction. Since the injection and ejection check valves of the second pump are connected to the actuator in opposing polarity to that of the first pump, the solenoid selected to receive power will determine the direction the actuator is incremented.

From the above description it is seen that the numeric output of the up/down pulse counter is a close estimate of the algebratic sum of the minute volumes supplied by the incrementers to the actuator and, therefore, is an estimate of the actuator position. The numeric output of the counter can represent the actuator position if fluid leakage, fluid compressibility effects with actuator loading, and fluid expansion effects due to temperature gradients (all of which cause position offsets) are negligble or tolerable. Actuator position of servos used in systems in which outer loop control is employed can certainly be represented by the numeric output of the counter.

Of course, position offset can be eradicated within the bit resolution of the servo reference by replacing the counter with an equally precise actuator position encoder (either the absolute type or the incremental type requiring associated electronics). However, a lower cost scheme in which only an occasional correction is made is feasible. In the proposed servo the occasional correction is effected by an exclusive OR comparison of the single bit output (23) of a single track encoder (24) with the corresponding significant bit of the counter which determines if an offset exists and which of the two incrementers must be pulsed to reduce or eradicate the offset. It will be necessary to space the bit transitions of the track to an even multiple of an actuator increment so that comparison may take place one bit before and one bit after the *expected* bit transition of the encoder as *anticipated* by the corresponding bit of the counter.

By way of illustration, a set of binary numbers which represent increasingly negative outputs of an 11 bit up/down counter is shown in Table 1.

TABLE 1

|  | C11 | C10 | C9 | C8 | C7 | C6 | C5 | C4 | C3 | C2 | C1 |
|---|---|---|---|---|---|---|---|---|---|---|---|
| more | 1 | x | x | x | x | 0 | 1 | 1 | 1 | 1 | 0 |
| neg. | 1 | x | x | x | x | 0 | 1 | 1 | 1 | 1 | 1 |
| ↑ | 1 | x | x | x | x | 1 | 0 | 0 | 0 | 0 | 0 |
|  | 1 | x | x | x | x | 1 | 0 | 0 | 0 | 0 | 1 |

The numbers consist of two values above and two values below the sixth significant bit transition. The bits in columns C7 through C10 are arbitrarily ones or zeros. In an 11-bit system there are a total of 63 sixth bit transitions, 31 for positive numbers and 31 for negative numbers and 1 between zero (all zeros row) and minus one (all ones row).

A corresponding set of binary numbers which is constructed using the single bit of the encoder as the sixth significant bit is shown in Table 2.

TABLE 2

|  | E11 | E10 | E9 | E8 | E7 | E6 | E5 | E4 | E3 | E2 | E1 |
|---|---|---|---|---|---|---|---|---|---|---|---|
| more | — | — | — | — | — | 0 | — | — | — | — | — |
| neg. | — | — | — | — | — | 0 | — | — | — | — | — |
| ↑ | — | — | — | — | — | 1 | — | — | — | — | — |
|  | — | — | — | — | — | 1 | — | — | — | — | — |

Since, in the absence of offset, the encoder sixth bit follows the counter sixth bit, the missing bits of the encoder can be thought to be identical to those of the counter.

The basic offset detection and correction process is simple, requiring a small number of logic gates to implement the function as evident from the correction logic (18). If bits c1 through C5 are all zeros (AND gate (27) is high) and if bits C6 and E6 are different (Exclusive OR gate (28) is high), the incrementer which yields a negative-to-positive increment (relative to the reference) is pulsed. If, on the other hand, C1 through C5 are all ones (AND gate (29) is high) and C6 and E6 are again different, the incrementer which yields a positive-to-negative increment is pulsed. If, however, C1 through C5 are all ones or zeros but C6 and E6 are identical, no correction is necessary. It should be noticed that the conditions that C1 through C5 be all ones or all zeros are both necessary if offsets of either polarity are to be detected. In FIG. 1, C6 is line (25) and E6 is line (23).

Correction pulses are generated by one of two one shots (30) depending on which is leading edge triggered. Triggering is effected by the corresponding AND gate (32) while the clock (34) is high and subsequently by the clock itself as long as the remaining inputs to the AND gate remain high. The correction pulses are OR gated with those generated by the converter and are applied to the set input of the set/reset flip flop. Since each correction pulse brings the actuator position one increment closer to that indicated by the counter, the counter will not represent a better estimate of the actuator position. Thus, with one or more transitions of the counter sixth bit, any actuator offset will be eliminated and the counter will, for the time being, represent the true position of the actuator.

Regardless of operating time, the net magnitude of the correction should remain low. This suggests using the one shot outputs to clock a second up/down counter in order to detect any offset abnormality that may indicate a pending failure, for instance an actuator seal leak.

The sixth significant bit comparison chosen to illustrate the correction process may well be a good engineering selection considering cost and encoder resolution in many applications. The highest possible offset monitoring resolution would call for a second significant bit comparison (the first or least significant bit must be reserved to provide information as to which direction a correction must take). At the other extreme, choosing the most significant bit would constitute the lowest cost encoder since a simple micro switch positioned to change state as the actuator passes the center of travel may suffice. Besides offset correction, the switch provides a means to effect a zero preset of the servo.

The highest monitoring resolution case which calls for a second significant bit comparison provides continuous offset monitoring of the actuator position. This stiffens the actuator to external forces and is particularly attractive in applications where an external force must not strain the actuator beyond the least significant bit. Straining the actuator up to the fourth significant bit is conceivable in spite of the high stiffness of the hydraulic fluid which is locked positively in the control chambers.

Obviously, the gain in stiffness is lost if the external force can strain the actuator faster than the highest allowable correction rate as when the actuator is subjected to high frequency high amplitude vibration forces. In such cases, it is better to dynamically decouple the servo from the load rather than to allow it to waste energy attempting to cope with an unmanageable situation. In the proposed servo, this is simply accomplished by backing off on the encoder resolution and/or by reducing the frequency of clock (34) which can vastly lower the correction rate.

Lowering the sensitivity of the servo to load disturbances while maintaining a high control resolution is a unique feature. It may well yield power savings in excess of 50% in controls characterized by high intensity disturbances. Trust vector controls fall in this category.

If the states of the up/down counter are volatile on power turn-off, it will be necessary at power turn-on to preset the counter to the pre-turn-off position of the actuator before normal operation of the servo is again allowed. Actuator offset that may have accumulated during turn-off can be eradicated during normal operation after the preset enable discrete (35) is lifted. Correction, however, can take place during preset if, before power is turned off, a computer subroutine commands the servo to a position adjacent to an expected transition of the actuator encoder. At power turn-on the subroutine alternately commands the servo and presets the counter to both adjacent positions of the selected transition, allowing enough opportunity for the correction process to align the actuator. The preset binary (36) is, of course, the negative of the command binary (10). The alternating of the command and preset binaries between the adjacent positions is necessary so that correction can take place regardless of the offset polarity. Once the preset enable discrete is lifted, normal operation is allowed.

In very high resolution servos where a high resolution of the encoder is desired (such that during turn-off the actuator offset can become greater than the bit spacing of the encoder) the servo may be preset to the wrong position. This possibility can be avoided by adding a sufficiently course track to the encoder for the sole purpose of performing the preset function.

Power Unit Description

The power unit contains the two electrohydraulic incrementers, the hydraulic actuator (which encloses the position encoder) and the common mode volume adjuster (22). The actuator selected for illustration is a linear type having slightly unequal piston areas as seen from control chambers (40) and (41).

The common mode volume adjuster is a stepped, freefloating piston. The stepped piston areas which face the control chambers should be proportioned to the corresponding piston areas of the actuator in order to maximize the stiffness presented to external loads and to minimize offset caused by thermal expansion of fluid in the control chambers. At the opposite end of the volume adjuster, compressed gas is used in back chamber (44) to set the mean (common mode) pressure in the control chambers. The stepped piston moves in response to changes in volume which are common to both control chambers, remaining essentially motionless in response to changes in differential pressure.

In operation as one of the pump pistons is extended to its limit, the injected fluid will compress the volume adjuster by an amount which is proportional to the injected volume and inversely proportional to the sum of the piston areas facing the control chambers. In the process, the actuator must also be shifted by an amount corresponding to the volume of fluid drawn by the area of the volume adjuster piston facing the ejected side and the area of the actuator piston of the same side. As the applied force of the solenoid decays, a point will be reached where the gas pressure of the volume adjuster will open the ejection check valve and retract the pump piston to its starting position. In the process the volume adjuster will now be expanded and the actuator once more shifted in the same direction, this time by a distance corresponding to the volume of fluid displaced by the area of volume adjuster piston facing the injected side and to the actuator piston area of the same side. Except for the special case where the actuator piston areas are equal, there will be a net up or down shift in the volume adjuster. The net shift is proportional to the difference in the actuator piston areas and inversely proportioned to the sum of the volume adjuster piston areas. The shift affects the size of the volume adjuster and raises the question as to whether it is better to design a power unit with a larger balanced actuator but smaller volume adjuster or a smaller unbalanced actuator but larger volume adjuster.

An optional feature of the volume adjuster is the pressure regulation of the gas chamber by means of electrical heating element (45) which is on/off controlled by pressure switch (46). Ceramic insulation (47) along the interior surfaces of the chamber serve to reduce the average power required to maintain the desired pressure. A constant common mode pressure is desirable in order to allow the solenoids to be sized optimally for a given set of actuator load and rate requirements.

A key feature of the power unit is the use of high-force, fast-response solenoids. Recently developed solenoids called "colenoids" (a trademark of Lucas Industries, Limited, U.K., for distributively wound solenoids) meet this requirement. Such solenoids are capable of acceleration of typically 2000 G's for low inertia loads displaced over a short distance. Variations of these designs have been contrived, good examples being U.S. Pat. Nos. 4,312,316 and 4,326,139. Design data can be found in SAE Transactions 790119 and 810462 published by the Society of Automotive Engineers, Inc., Warrendale, Pa.

A 0.05 to 0.1 cm solenoid displacement is well suited for incrementing a medium size actuator. For example, assuming a balanced actuator having piston areas equal to 13 cm$^2$ and an end-to-end stroke equal to 6.2 cm, if the diameter and stroke of the pump piston is 1 cm and 0.05 cm, respectively, the number of increments required to fully span the actuator is 2052. This corresponds to a servo having an eleven-bit resolution (2048 increments, each 30.2 microns) which is fine enough for aerospace applications.

Figure 2:
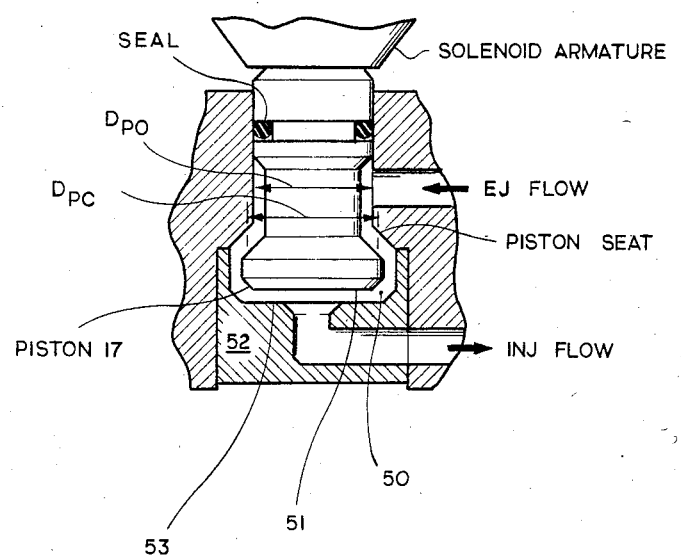

Other key features of the power unit lie in the details of the pump configuration which are shown in FIG. 2. Referring to the figure, diameter $D_{PO}$ determines the piston sweep area, $A_{PO}$, in the open position while diameter $D_{PC}$ determines the effective area, $A_{PC}$, in the closed position as viewed from the pump chamber (50). The volume displacement of the pump is $A_{PO}d$ where d is the maximum distance between the piston top (51) and piston stop (52). Enough squish area (53) is preserved between the piston top and stop to provide a degree of snubber action.

A high holding pressure $P_{FB}$ is possible when the piston is seated which prevents higher than normal transient forces on the actuator from forward biasing the check valves beyond their combined crack-open pressure, $P_{EJCV} + P_{INJCV}$. Here $P_{EJCV}$ and $P_{INJCV}$ are the individual crack-open pressures of the ejection and injection check valves. For an ejection side actuator pressure $p_{A,EJ}$ much larger than an injection side actuator pressure $p_{A,INJ}$ the threshold pressure of $p_{FB}$ beyond which sudden, high flow rate occurs can be determined from the summation of forces equation.

$$p_{FB,TH}(A_{PC}-A_{PO})-p_{P,MIN}A_{PC}=0$$

or $$p_{FB,TH}=(A_{PC}/(A_{PC}-A_{PO}))p_{P,MIN}$$

where $p_{FB,TH}$ which is also equal to $p_{A,EJ,MAX}-P_{EJCV}$ is the forward biasing threshold pressure and $p_{P,MIN}$, which is also equal to $p_{A,INJ,MIN}-P_{INJCV}$, is the minimum allowable pressure of the pump chamber. The area ratio $A_{PC}/(A_{PC}-A_{PO})$ which can be made several times larger than unity designates the effective gain in holding pressure that has been achieved by the seated piston.

Obviously, the gain in holding pressure is lost when the piston is unseated and the check valves are exposed to the actuator load. Now the combined check valve crack-open pressure, $P_{EJCV}+P_{INJCV}$, must be high enough to prevent a normal force on the actuator from forward biasing the closed check valve. The combined crack-open pressure, therefore, determines the maximum differential pressure across the actuator that can be allowed while incrementation takes place.

Up to this point attention has been directed to the case when the load on the actuator aids incrementation. With the load opposing incrementation, the pressure in the pump chamber is higher and holding the actuator during incrementation is not a problem. However, in this case, the net drive on the moving mass of the incrementer decreases both during injection and ejection, thus increasing the time required to complete an incrementation cycle. The dynamic response of the servo, however, will not be affected as long as the minimum pulse repetition period (PRP) is set longer than the longest injection/ejection cycle period under worst case loading. Thus Min Allowable PRP $> t_{INJ,MAX}+t_{EJ,MAX}$ In turn, the maximum allowed injection/ejection cycle period is determined from the required actuator stroke, S, the minimum allowed actuator rate, R, and the number of increments, $2^N$, required to span the actuator. The equation is $$t_{INJ,MAX}+t_{EJ,MAX}=S/R2^N$$

The required pump incremental volume, $A_{PO}d$, depends on the actuator piston area, $A_A$, selected to meet the actuator force requirement, $F_A$ and is equal to $A_AS/2^N$.

In servo applications, d can be small (which is desirable from the standpoint of high solenoid force and speed) provided $A_{PO}$ is kept within a reasonable size (which will generally be the case). Once d and $A_{PO}$ are determined, sizing the solenoid in terms of its average force, $F_S$, or its armature weight W, (since $F_S/W$ is nearly constant) will depend on the required actuator requirements and on injection and ejection time constraints. At maximum actuator differential pressure, $p_{A,INJ,MAX}-p_{A,EJ,MIN}$ determined by $P_{EJCV}+P_{INJCV}$, the resulting injection and ejection acceleration factors of the solenoid armature and pump piston are $$G_{INJ,MIN}=(F_S/A_{PO}-p_{P,INJ,MAX})A_{PO}/W=2d/t^2_{INJ,MAX}$$

$$G_{EJ,MIN}=p_{P,EJ,MIN}A_{PO}/W=2d/gt^2_{EJ,MAX}$$

where
$G=F_S/W$ is the average no-load acceleration factor
$p_{P,INJ}=p_{A,INJ}-P_{INJCV}$
$p_{P,EJ}=p_{A,EJ}+P_{EJCV}$ These equations establish the required operating pressures in the pump and actuator as well as the solenoid size for a set of actuator requirements. When setting these design parameters, it will be advantageous from a speed standpoint to equalize the injection and ejection times. Once the design parameters are determined, the required charge pressure in the volume adjuster will be known.

Using design requirements for a high force aerospace servo having an eleven-bit resolution, the total, worst case, inject/eject cycle period will range, depending on design objectives, between 1.2 and 1.7 milliseconds. This means that the actuator can be slewed end-to-end between 2.5 and 3.5 seconds which is generally fast enough for flight control applications. Obviously, the maximum slew rate can be doubled by using two pairs of incrementers with alternating overlapping incrementation or by specifying a ten-bit servo with larger size incrementers (in terms of twice $F_S$ and twice $A_{PO}$ for instance).

The bandwidth of the basic (first order) servo, if operated within the linear range of the error limiter, is determined by the rate gain of the error to pulse frequency converter. Since it is desirable to set the error limit ($\epsilon_{LIMIT}$) to correspond to the minimum allowed pulse repetition period, the servo bandwidth in hertzs is $$BW=\tfrac{1}{2}\pi T, T=(\text{Min Allow PRP})\epsilon_{LIMIT}$$

With the minimum allowed PRP equal to 1.7 millisecond for an error limit set to 187 increments, the bandwidth is 0.5 hertz which falls within the range of slow aerospace servos. Reducing the minimum allowed PRP to 1.2/2 millisecond (the factor 2 implies two pairs of incrementers) and the error limit to 53 increments yields a bandwidth of 5.0 hertzs which is within the range of fast aerospace servos.

Energy Conservation Measures

With the maximum allowable load on the actuator opposing or aiding incrementation, the lowest and highest accelerations during injection depend on $p_{P,INJ,MAX}$ and $p_{P,INJ,MIN}$ respectively and can differ by a factor of roughly 3. The difference between the longest and shortest injection times has been shown to vary by the square root of this factor or roughly by 1.7. This sizable factor indicates that, in order to conserve electrical energy, the drive signal should be terminated as soon as the full extension of the pump piston is reached. A turn-off short of this point, relying on mechanical and electrical inertia to carry the piston to the end, would add to the energy savings. A net energy savings of roughly 35 percent, based on the fact that the net aided and opposed motion of an actuator is generally zero, is possible.

Early turn-off of the drive signal requires sensing the position of the pump piston. Perhaps the least costly and most reliable method is to sense when the pump bottoms by means of an electrical contact of the piston top and the squish area of the piston stop. This would require an insulated piston stop and low conduction through gold plated contacts. If turn-off before contact is desired, a separate, discrete signal, pump position indicator may be used. This embodiment is shown in FIG. 1. The discrete output of the position indicator (54) directly provides the reset pulse to the set/reset flip flop when full extension of the pump is about to be reached. As a safeguard in the event of sensor failure, provision for turn-off based on piston contact and/or the longest allowable injection time may be incorporated.

Up to this point, a servo rate limit which is based on a fixed PRP has been described. In some applications where faster rates are needed at low loads, a servo that is rate limited up to the minimum achievable cycle period under low load conditions and, therefore, can rate saturate at higher loads will permit the use of smaller solenoids. However, the safeguard which provides turn-off based on the longest allowable injection time will now be required in order to prevent excessive heating of the solenoids when rapidly operated under high load conditions.

If, however, a much slower actuator rate and associated shorter stroke are allowed at high load or, conversely, if a much faster actuator rate and longer stroke are required at low load, as in the case of aerosurface controls which operate over a wide range of dynamic pressure, the use of two pairs of incrementers, one for large increments, the other for small increments, will be desirable. This results in a dual mode servo which minimizes the energy consumed by the incrementers.

Some adjustments to the check valves of the large displacement pumps of the fast rate/low load mode will be necessary. The combined crack-open pressure, $P_{INJCV}+P_{EJCV}$, of these pumps can be lowered in order to further increase speed and reduce energy. However, since the common mode pressure must be set high in order to meet the high load requirements of the slow rate/high load mode, the large displacement pumps will inject slower and eject faster unless $P_{INJCV}$ is made small relative to $P_{EJCV}$ and/or the solenoids of these pumps are made larger (higher armature force and mass). Obviously, many design parameters may be varied. The designer, however, can be assured that one set of parameters will optimally satisfy the performance requirements. Offset correction for both modes of operation will still be possible using the same actuator position encoder and essentially the same correction circuits. This is provided the difference between the volume increments of the two pump sizes is restricted to integer multiples. A dual mode servo having 12-bit and 9-bit resolutions, a force advantage of 6 in fine control and a rate advantage of 6 in course control is a typical possibility.

It may also be advantageous from an energy conservation standpoint to quickly peak the drive current in order to produce a high initial flux density in the solenoid armature and then, as the armature-to-stator gap narrows and magnetic reluctance rapidly decreases, reduce the drive current in order to prevent saturation and/or high cooper losses. The technique wherein the power amplifier drive voltage is on/off modulated can be used to appropriately shape the drive current. What is needed is a pump position indicator which can sequentially provide reset discretes to the flip flop at the appropriate pump positions. Concurrently, the set pulse must be replaced by a set discrete which remains high until the last reset discrete is issued.

In the above on/off modulation scheme, magnetic energy is repeatedly stored in th solenoid windings and should be recovered. Toward this end, an amplifier output configuration such as the one indicated in FIG. 1 should be incorporated. In the indicated configuration, transistors Q1 and Q2 are jointly switched on and off. During the turnoff intervals, the exponentially decaying current is routed back to the power supply through diodes D1 and D2.

Electrical energy can also be conserved by first increasing the crack-open pressure of the check valves so that one can provide the entire holding pressure needed to contain the actuator and then reducing it to a very low level when conduction is required. The reduction in crack-open pressure can be accomplished by small, coaxial solenoids which forward bias the check valves as directed by the pump position indicator. Thus, as one of the valves injects or ejects fluid through a low pressure drop, the other singly contains the actuator. An energy saving of roughly 20% is possible with this provision.

Obviously, opportunities for significant energy conservation abound. However, as significant as the savings may be, the greatest reduction will probably be the result of zero energy consumption of the incrementers between pulsing events. In contrast, because of the generally low mean duty cycle of servos, present electrohydraulic servos may dissipate more power from quiescent flow in the servovalve pilot stage than from control flow in the servovalve spool.

Digital Servovalves

Very large actuators may call for solenoids and pumps which are either too large or too numerous to be practical. Although it may be required to resort to a hydraulically powered servo, the usual analog servovalve, nevertheless, can be replaced by a digital unit. In applying the foregoing digital servo concepts to the implementation of a digital servovalve, a flow control spool replaces the usual actuator and the following, less obvious changes are made:

1. The spool positioning resolution (the number of increments required to span the spool end-to-end) can be vastly reduced since the actuator motion will now follow a first order hold profile rather than a zero order hold profile.

2. The crack-open pressure of the check valves can be significantly lowered since loads that aid incrementation do not exist.

3. The usual leakage path between supply pressure and the end chambers of the spool is capitalized to automatically clamp the common mode pressure to the supply pressure. This eliminates the need to pressure regulate the volume adjuster gas chamber.

4. The servovalve may be operated with an up/down counter loop closure which produces a single lag inner loop or with a lead-lag digital filter which compensates for double integration. In either case, offset correction is not necessary because of overall feedback from the actuator.

5. Energy conservation measures need not be utilized since the load dependent injection/ejection cycle period will generally exhibit little change.

Although the servovalve will operate with essentially zero differential pressure across the spool, an available differential pressure as high as 1.7 times the common mode pressure is feasible. Should the spool seize, pump action will cause this pressure to develop instantly, forcing the spool to move according to pump motion. Thus, unlike analog servovalves, the actuation of the spool will not be affected by stiction provided, of course, the pressure required to overcome this force is less than the maximum available pressure and as long as the injection/ejection cycle durations are within the allowable limit.

Although the preferred embodiment of the invention of FIG. 1 has been described, it will be understood that various substitutions and alterations, some which have been presented, can be made therein without departing from the spirit and scope of the invention.

What is claimed is:

1. A completely digital, electrically powered, electrohydraulic servo, the hydraulic actuator of said servo controlled in accordance with a binary reference representing the command position, a binary error derived from the difference of said binary reference and a binary feedback representing the position of the actuator, said binary error limited and converted to a pulse train having a pulse repetition frequency which is proportional to the magnitude of the binary error, each pulse of said pulse train gated by the sign bit of the error binary number to one of two electrohydraulic incrementers through the set input of a corresponding set/reset flip flop, the initiation of the servo drive signal by the change from a low state to a high state of the output of the flip flop as the result of the set pulse, the termination of the servo drive signal by the change from a high state to a low state of said output as the result of a reset pulse, the servo drive signal formed by the set and reset pulses, said drive signal power amplified and applied to the corresponding solenoid of a solenoid driven piston pump, a pump position indicator set to issue the reset pulse at a point near the full extension of the piston pump; the injection of the displaced incremental volume of fluid through an injection check valve into the corresponding actuator control chamber by the extension of the piston pump, the ejection of said volume through an ejection check valve from the opposite actuator control chamber by the retraction of said piston pump; a volume adjuster connected to the actuator control chambers, said volume adjuster consisting of a free-floating, stepped piston, first and second areas separately connected to the first and second actuator control chambers, respectively, said first and second areas sized proportionally to the piston areas of the actuator facing the first and second control chambers, the opposite side of the volume adjuster charged with compressed gas which sets the operating common mode pressure of the actuator.

2. The servo in accordance with claim 1 wherein the binary feedback representing the position of the actuator is acquired from a presettable up/down counter, said counter clocked by the pulse train generated by the error-to-pulse frequency converter in either the up-count or down-count direction depending on the sign bit of the error binary number, said count having the direction which reduces the error.

3. The servo in accordance with claim 1 or claim 2 wherein provisions for reducing actuator offset are incorporated, such provisions comprising an actuator position encoder having at least one track, any one track yielding a single binary equal to or lower than the most significant bit of the servo control binary number but equal to or higher than the second significant bit of said control binary number, the single encoder bit exclusive OR compared with the equally significant bit of the up/down counter when all lower significant bits of the counter are all zeros and all ones, the setting of the set/reset flip flop corresponding to one of the two electrohydraulic incrementers by the low to high change of state of the exclusive OR comparator, the selection depending on whether the corresponding lower significant bits are all zeros or all ones, said setting of the flip flop causing an incrementation of the actuator in the direction which reduces the offset.

* * * * *